US010381739B2

(12) United States Patent
Keniuk et al.

(10) Patent No.: US 10,381,739 B2
(45) Date of Patent: *Aug. 13, 2019

(54) SYNCHRONIZED MULTIPLE-RADIO ANTENNA SYSTEMS AND METHODS

(71) Applicant: Ubiquiti Networks, Inc., New York, NY (US)

(72) Inventors: Richard J. Keniuk, Cary, IL (US); Gary D. Schulz, Cary, IL (US)

(73) Assignee: Ubiquiti Networks, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,389

(22) Filed: Sep. 24, 2018

(65) Prior Publication Data
US 2019/0044248 A1 Feb. 7, 2019

Related U.S. Application Data

(63) Continuation of application No. 15/702,658, filed on Sep. 12, 2017, now Pat. No. 10,084,238, which is a continuation of application No. 15/289,487, filed on Oct. 10, 2016, now Pat. No. 9,761,954.

(60) Provisional application No. 62/239,831, filed on Oct. 9, 2015, provisional application No. 62/277,862, filed on Jan. 12, 2016.

(51) Int. Cl.
H01Q 19/10 (2006.01)
H01Q 1/24 (2006.01)
H01Q 15/16 (2006.01)
H01Q 21/00 (2006.01)
(Continued)

(52) U.S. Cl.
CPC ............... *H01Q 19/10* (2013.01); *H01Q 1/24* (2013.01); *H01Q 15/16* (2013.01); *H01Q 19/13* (2013.01); *H01Q 21/00* (2013.01); *H04B 1/00* (2013.01)

(58) Field of Classification Search
USPC .......................... 455/550.1, 552.1, 502, 509
See application file for complete search history.

(56) References Cited

U.S. PATENT DOCUMENTS 3,851,221 A   11/1974  Beaulieu et al.
4,087,822 A   5/1978   Maybell et al.
(Continued)

FOREIGN PATENT DOCUMENTS

CN    1527439 A     9/2004
CN    203760677 U   8/2014
(Continued)

OTHER PUBLICATIONS

Pera et al., U.S. Appl. No. 16/231,543 entitled "Multi-sector antennas," filed Dec. 23, 2018.

*Primary Examiner* — Fayyaz Alam
(74) *Attorney, Agent, or Firm* — Shay Glenn LLP

(57) ABSTRACT

Multi-radio antenna apparatuses and stations for wireless networks including multiple radios coupled to a single transmit/receive antenna, in which the antenna is highly synchronized by an external (e.g., GPS) signal. These multi-radio antenna systems may provide highly resilient links. Synchronization may allow these apparatuses to organically scale the transmission throughput while preventing data loss. The single transmit/receive antenna may have a single dish or a compound (e.g., a single pair of separate transmitting and receiving dishes) and connections for two or more radios.

15 Claims, 14 Drawing Sheets

(51) Int. Cl.
*H01Q 19/13* (2006.01)
*H04B 1/00* (2006.01)

(56) References Cited

U.S. PATENT DOCUMENTS

| | | |
|---|---|---|
| 4,557,225 A | 12/1985 | Sagues et al. |
| 4,656,559 A | 4/1987 | Fathi |
| 5,131,006 A | 7/1992 | Kamerman et al. |
| 5,151,920 A | 9/1992 | Haagh et al. |
| 5,295,154 A | 3/1994 | Meier et al. |
| 5,381,314 A | 1/1995 | Rudy et al. |
| 5,406,260 A | 4/1995 | Cummings et al. |
| 5,422,887 A | 6/1995 | Diepstraten et al. |
| 5,428,636 A | 6/1995 | Meier |
| 5,504,746 A | 4/1996 | Meier |
| 5,546,397 A | 8/1996 | Mahany |
| 5,548,481 A | 8/1996 | Salisbury et al. |
| 5,596,487 A | 1/1997 | Castaneda et al. |
| 5,629,713 A | 5/1997 | Mailandt et al. |
| 5,706,428 A | 1/1998 | Boer et al. |
| 5,740,366 A | 4/1998 | Mahany et al. |
| 5,828,339 A | 10/1998 | Patel |
| 5,844,893 A | 12/1998 | Gollnick et al. |
| 5,930,113 A | 7/1999 | McCann |
| 5,936,542 A | 8/1999 | Kleinrock et al. |
| 5,936,588 A | 8/1999 | Rao et al. |
| 5,940,771 A | 8/1999 | Gollnick et al. |
| 6,028,769 A | 2/2000 | Zurek |
| 6,038,129 A | 3/2000 | Falaki et al. |
| 6,084,772 A | 7/2000 | Pell et al. |
| 6,130,892 A | 10/2000 | Short et al. |
| 6,194,992 B1 | 2/2001 | Short et al. |
| 6,295,028 B1 | 9/2001 | Jonsson et al. |
| 6,337,990 B1 | 1/2002 | Koshino |
| 6,374,311 B1 | 4/2002 | Mahany et al. |
| 6,522,307 B2 * | 2/2003 | Kim .............. H04B 7/06 343/850 |
| 6,563,786 B1 | 5/2003 | Van Nee |
| 6,636,894 B1 | 10/2003 | Short et al. |
| 6,643,522 B1 * | 11/2003 | Young .............. H04B 1/005 455/41.2 |
| 6,665,536 B1 | 12/2003 | Mahany |
| 6,697,416 B1 | 2/2004 | Mahany |
| 6,714,559 B1 | 3/2004 | Meier |
| 6,788,250 B2 | 9/2004 | Howell |
| 6,789,110 B1 | 9/2004 | Short et al. |
| 6,795,852 B1 | 9/2004 | Kleinrock et al. |
| 6,810,426 B2 | 10/2004 | Mysore et al. |
| 6,813,260 B1 | 11/2004 | Fogle |
| 6,857,009 B1 | 2/2005 | Ferreria et al. |
| 6,868,399 B1 | 3/2005 | Short et al. |
| 7,020,082 B2 | 3/2006 | Bhagavath et al. |
| 7,038,620 B1 | 5/2006 | Chubb et al. |
| 7,040,383 B2 | 5/2006 | Oyamada |
| 7,079,079 B2 | 7/2006 | Jo et al. |
| 7,088,727 B1 | 8/2006 | Short et al. |
| 7,117,526 B1 | 10/2006 | Short |
| 7,136,286 B2 | 11/2006 | Chuang |
| 7,161,804 B2 | 1/2007 | Oyamada |
| 7,194,554 B1 | 3/2007 | Short et al. |
| 7,197,556 B1 | 3/2007 | Short et al. |
| 7,295,812 B2 | 11/2007 | Haapoja et al. |
| 7,386,002 B2 | 6/2008 | Meier |
| 7,457,646 B2 | 11/2008 | Mahany et al. |
| 7,477,917 B2 * | 1/2009 | Rofougaran ......... G06K 7/0008 455/11.1 |
| 7,532,908 B2 * | 5/2009 | Rofougaran ......... G06K 7/0008 455/11.1 |
| 7,593,230 B2 | 9/2009 | Abul-Haj et al. |
| 7,633,757 B2 | 12/2009 | Gustine et al. |
| D618,630 S | 6/2010 | Wei et al. |
| 7,739,383 B1 | 6/2010 | Short et al. |
| 7,752,334 B2 | 7/2010 | Paunikar et al. |
| 7,764,504 B2 | 7/2010 | Phillips et al. |
| D621,796 S | 8/2010 | Hu et al. |
| D622,230 S | 8/2010 | Yan et al. |
| 7,826,426 B1 | 11/2010 | Bharghavan et al. |
| 7,889,701 B2 | 2/2011 | Malik et al. |
| 7,924,564 B1 | 4/2011 | Wilson |
| 8,077,113 B2 | 12/2011 | Syed et al. |
| 2,007,750 A1 | 3/2012 | Schadler et al. |
| 8,184,064 B2 | 5/2012 | Sanford |
| 8,190,708 B1 | 5/2012 | Short et al. |
| 8,335,272 B2 | 12/2012 | Roberts |
| 8,483,188 B2 | 7/2013 | Walton et al. |
| 8,498,574 B2 * | 7/2013 | Beninghaus ......... H04B 1/3805 370/328 |
| 8,604,989 B1 | 12/2013 | Olsen |
| 8,724,605 B2 | 5/2014 | Zhang et al. |
| 8,736,503 B2 | 5/2014 | Zaghloul et al. |
| 8,836,601 B2 | 9/2014 | Sanford et al. |
| 8,977,733 B1 | 3/2015 | Phuong et al. |
| 9,293,817 B2 | 3/2016 | Sanford |
| 9,368,870 B2 | 6/2016 | Dayanandan et al. |
| 9,761,954 B2 | 9/2017 | Keniuk et al. |
| 9,807,905 B2 | 10/2017 | Sporer et al. |
| 9,843,096 B2 | 12/2017 | Sanford |
| 9,912,053 B2 | 3/2018 | Sanford et al. |
| 10,069,580 B2 | 9/2018 | Hardy et al. |
| 10,084,238 B2 | 9/2018 | Keniuk et al. |
| 2002/0101388 A1 | 8/2002 | Ippolito |
| 2002/0126062 A1 | 9/2002 | Matthews |
| 2002/0138443 A1 | 9/2002 | Schran et al. |
| 2002/0193945 A1 * | 12/2002 | Tan .............. H04B 7/2671 701/469 |
| 2003/0052830 A1 | 3/2003 | Ogawa et al. |
| 2003/0128684 A1 | 7/2003 | Hirsh et al. |
| 2004/0027816 A1 | 2/2004 | Ice |
| 2004/0033817 A1 | 2/2004 | Gorsuch et al. |
| 2004/0203528 A1 | 10/2004 | Ammar et al. |
| 2005/0075070 A1 | 4/2005 | Crilly |
| 2005/0285803 A1 | 12/2005 | Iacono et al. |
| 2006/0020978 A1 | 1/2006 | Miyagawa |
| 2006/0114839 A1 | 6/2006 | Meier et al. |
| 2006/0203789 A1 | 9/2006 | Iacono et al. |
| 2006/0209876 A1 | 9/2006 | Liu et al. |
| 2006/0268760 A1 | 11/2006 | Fang et al. |
| 2007/0001918 A1 | 1/2007 | Ebling et al. |
| 2007/0058336 A1 | 3/2007 | Cheng et al. |
| 2007/0182657 A1 | 8/2007 | Chiang et al. |
| 2007/0285327 A1 | 12/2007 | Paschen et al. |
| 2009/0264148 A1 | 10/2009 | Tom |
| 2009/0286569 A1 * | 11/2009 | Rousu .............. H01P 1/213 455/553.1 |
| 2009/0312044 A1 | 12/2009 | Hottinen |
| 2010/0014502 A1 | 1/2010 | Singh et al. |
| 2010/0060531 A1 * | 3/2010 | Rappaport ......... H01Q 1/243 343/702 |
| 2010/0073260 A1 | 3/2010 | Fujita |
| 2010/0238846 A1 | 9/2010 | Xu et al. |
| 2010/0271985 A1 * | 10/2010 | Gabriel .............. H01Q 1/246 370/278 |
| 2010/0283707 A1 | 11/2010 | Foo |
| 2011/0063182 A1 | 3/2011 | Sanford |
| 2011/0064033 A1 | 3/2011 | Gong et al. |
| 2011/0116230 A1 | 5/2011 | Kwak et al. |
| 2012/0106070 A1 | 5/2012 | Landon |
| 2012/0276949 A1 | 11/2012 | Dorsey et al. |
| 2012/0302286 A1 * | 11/2012 | Beninghaus ......... H04B 1/3805 455/552.1 |
| 2013/0031201 A1 | 1/2013 | Kagan et al. |
| 2013/0072243 A1 | 3/2013 | Yu et al. |
| 2013/0072247 A1 | 3/2013 | Park et al. |
| 2013/0099895 A1 | 4/2013 | Harpak et al. |
| 2013/0115887 A1 | 5/2013 | Kwon et al. |
| 2013/0141294 A1 * | 6/2013 | Rappaport ......... H01Q 1/243 343/745 |
| 2013/0272263 A1 | 10/2013 | Pi et al. |
| 2013/0322495 A1 | 12/2013 | Behdad et al. |
| 2014/0218255 A1 | 8/2014 | Sanford et al. |
| 2015/0188267 A1 | 7/2015 | Choi et al. |
| 2015/0201429 A1 | 7/2015 | Chen et al. |
| 2016/0104942 A1 | 4/2016 | Pera et al. |

(56) References Cited

U.S. PATENT DOCUMENTS

| | | | |
|---|---|---|---|
| 2016/0105203 A1* | 4/2016 | Rilling | H04B 7/0848 |
| | | | 375/346 |
| 2016/0261030 A1 | 9/2016 | Kim et al. | |
| 2018/0034518 A1 | 2/2018 | Schulz et al. | |
| 2018/0261916 A1 | 9/2018 | Sanford et al. | |

FOREIGN PATENT DOCUMENTS

| | | |
|---|---|---|
| DE | 102012023938 A1 | 12/2014 |
| EP | 0886336 B1 | 10/2003 |
| JP | 10-303808 A | 11/1998 |
| WO | WO98/40990 A1 | 9/1998 |
| WO | WO01/31855 A2 | 5/2001 |
| WO | WO01/31886 A2 | 5/2001 |
| WO | WO01/86877 A2 | 11/2001 |
| WO | WO2006/084331 A1 | 8/2006 |
| WO | WO2007/069809 A1 | 6/2007 |
| WO | WO2008/042804 A2 | 4/2008 |
| WO | WO2011/005710 A2 | 1/2011 |
| WO | WO2014/191756 A1 | 12/2014 |

\* cited by examiner

4 X FASTER THROUGHPUT

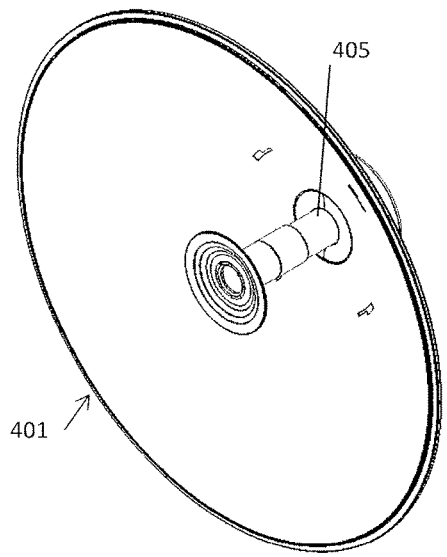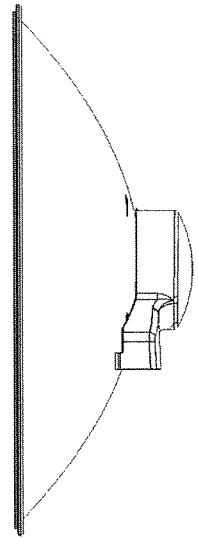
FIG. 4A              FIG. 4B
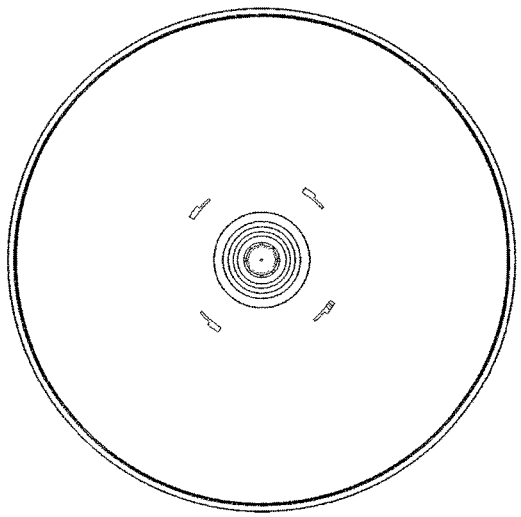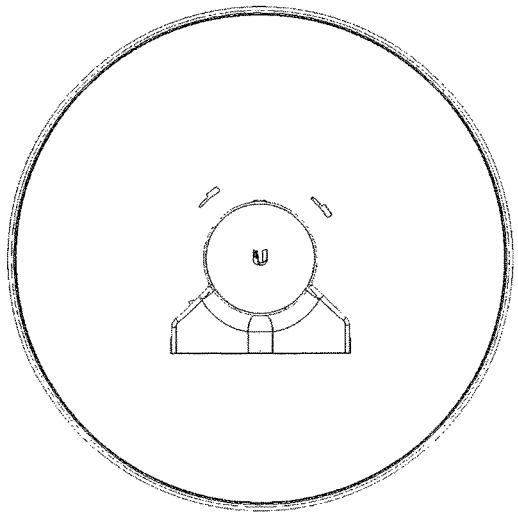
FIG. 4C              FIG. 4D

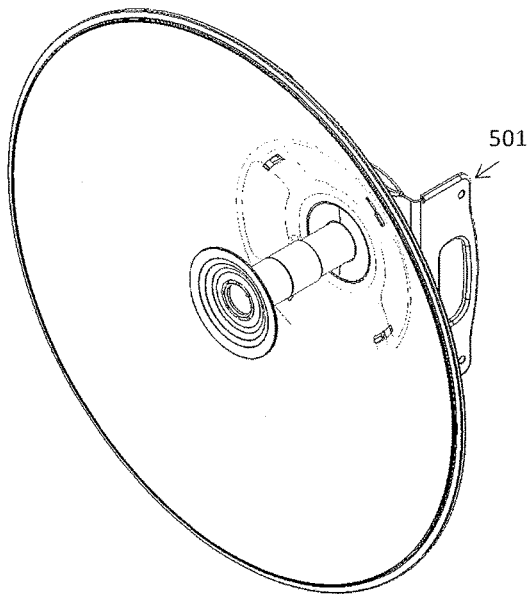 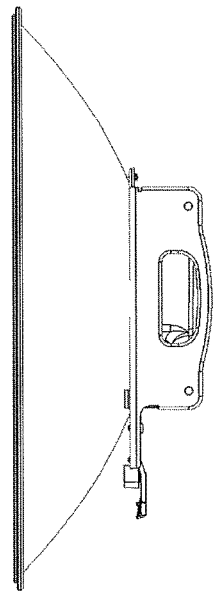
FIG. 5A  FIG. 5B
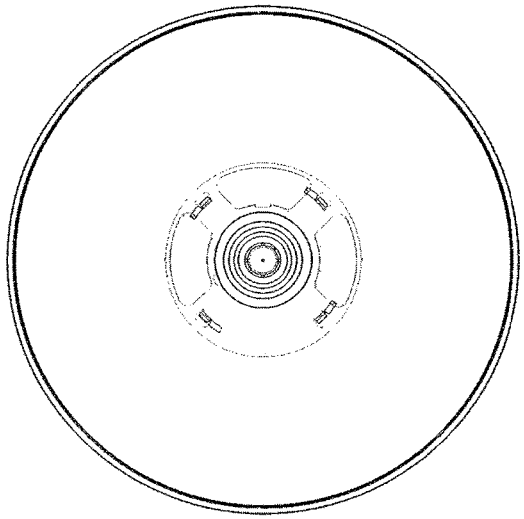 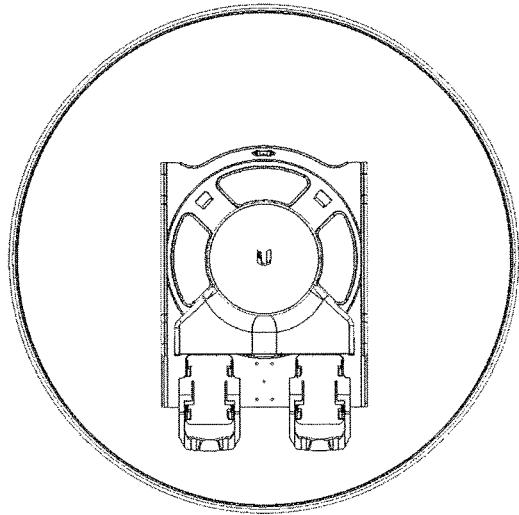
FIG. 5C  FIG. 5D

SYNCHRONIZED MULTIPLE-RADIO ANTENNA SYSTEMS AND METHODS

CROSS REFERENCE TO RELATED APPLICATIONS

This patent application is a continuation of U.S. patent application Ser. No. 15/702,658, titled "SYNCHRONIZED MULTIPLE-RADIO ANTENNA SYSTEMS AND METHODS, filed on Sep. 12, 2017, now U.S. Pat. No. 10,084,238, which is a continuation of U.S. patent application Ser. No. 15/289,487, titled "SYNCHRONIZED MULTIPLE-RADIO ANTENNA SYSTEMS AND METHODS," filed on Oct. 10, 2016, now U.S. Pat. No. 9,761,954, which claims priority to U.S. Provisional Patent Application Nos. 62/239,831, titled "SYNCHRONIZED MULTIPLE-RADIO ANTENNA SYSTEMS AND METHODS", filed on Oct. 9, 2015, and U.S. Provisional Patent Applications No. 62/277,862, titled "SYNCHRONIZED MULTIPLE-RADIO ANTENNA SYSTEMS AND METHODS" filed on Jan. 12, 2016, each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The apparatuses described herein generally relate to antenna having multiple radios connected to a single emitter/receiver for simultaneous transmission from each of the radios. The radios may be balanced (e.g., data packet load balanced).

BACKGROUND

Wireless networks are typically realized using point-to-multipoint radios. Also, some Internet service providers (ISPs) provide Internet connectivity to remote locations by installing radio towers that use point-to-point antennas to relay the network connection to the remote location. Some radio towers include both point-to-point and point-to-multipoint radios that are driven by a ground-level base station at the base of the tower.

Space in radio towers is often at a premium, and may be expensive. In general antenna assemblies, including point-to-point and point-to-multipoint antennas assemblies typically include a single radio that operate over the full bandwidth, and transmit and receive all RF data through the antenna. Each antenna requires space and separation from other antenna to prevent undesirable interference, requiring a significant amount of tower space and therefore expense. Although antenna systems in which more than one radio may be used, these systems typically require a great deal of coordination and communication between each radio of the system, resulting a slowing and inefficiencies of the resulting antenna system and also increased cost. Further, such systems are not well able to adapt to changes in the transmission rate (or disruption of) one or more of the radios. What is needed are antenna systems that may use multiple radios connected to the same antenna assembly in a scalable (e.g., linearly scalable) manner without requiring direct communication between the multiple radios.

In any multiple-radio apparatus it may be useful to split/combine RF signals transmitted. Combiner-splitters for RF systems are known. For example, the Wilkinson divider splitter/Wilkinson combiner is a form of power splitter/power combiner that is used in microwave applications and uses quarter wave transformers, which may be fabricated as quarter wave lines on printed circuit boards. These apparatuses may provide a cheap and simple splitter/divider/combiner. The Wilkinson splitter/combiner may be formed entirely of printed circuit board transmission line components, or it may include other forms of transmission lines (e.g. coaxial cable) or lumped circuit elements (inductors and capacitors).

A Wilkinson power divider is a passive electronic device that splits a single RF input signal into two (n=2) or more (n≥3) in-phase output RF signals. Such devices can also be used in the opposite direction to combine multiple in-phase RF signals into a single RF output. The details of design and operation for these devices are well known. Such devices are typically realized using resistors and impedance-transformer sections of RF transmission line (such as coaxial line, microstrip, stripline, etc.) in various configurations.

Thus, a Wilkinson power divider or Wilkinson splitter may be used as a multiple port device, including as a two way divider. Wilkinson splitter/combiners have known benefits and problems. Advantages include: Simplicity, low cost, relatively low loss, and reasonable isolation. For example a Wilkinson divider/splitter/combiner can be realized using printed components on a printed circuit board. It is also possible to use lumped inductor and capacitor elements, but this complicates the overall design. Although the cost may otherwise be very low, to reduce losses, a low-loss PCB substrate may be used, which may increase the cost. Loss may arise from the division of the power between the different ports, though components used for a Wilkinson splitter can be relatively low loss, especially when PCB transmission lines are used along with low-loss PCB substrate materials. Disadvantages of traditional Wilkinson splitters may include a reduction in frequency response. As the Wilkinson splitter is based around the use of quarter wave transmission lines, it has a limited bandwidth.

Described herein are apparatuses (systems and methods) that my address the issues raised above, and may take advantage of simple system of splitter/combiners (including chains of splitter/combiners) while enhancing performance, e.g., throughput, of the overall antenna apparatus.

SUMMARY OF THE DISCLOSURE

The present invention relates to methods and apparatuses (including devices and systems) for combining a plurality of radio frequency (RF) radios so that all of the radios can simultaneously and synchronously send or synchronously receive RF signals from a single antenna.

Described herein are methods of combining a plurality of radios so that they simultaneously send or receive from a single antenna. These methods may include: passively combining the inputs of each of the plurality of radios into a single output coupled to the single antenna; synchronizing each of the plurality of radios using a master synchronization signal (e.g., global positioning satellite, or GPS, signal), so that each of the plurality of radios is operating on a same duty cycle; simultaneously transmitting RF signals from each of the plurality of radios using the single antenna, wherein each of the plurality of radios transmits in different frequency channels; and simultaneously receiving RF signals in each of the plurality of radios using the single antenna.

Any of these methods may also include synchronizing the remote (e.g., slave) radios that communicate with the combined (master) radios). The slave devices may themselves be combined, or they may be separate radios.

For example, a method of combining a plurality of radios so that they simultaneously send or receive from a single antenna may include: passively combining the inputs of each of the plurality of radios into a single output coupled to the single antenna; periodically synchronizing each of the plurality of radios using a GPS signal, wherein each of the plurality of radios is operating on a same duty cycle; transmitting a synchronized master timing preamble from each of the plurality of radios; simultaneously transmitting RF signals from each of the plurality of radios using the single antenna, wherein each of the plurality of radios operates in different frequency channels; simultaneously receiving RF signals in each of the plurality of radios using the single antenna; and synchronizing a duty cycle of a first remote slave radio using the master timing preamble.

Any of the methods described herein may include attaching each of the plurality of radios to a single antenna. The radios may be attached via a mount or other attachment that holds the radio in communication with the multiplexer and the single antenna. Each antenna may be configured to transmit/receive in multiple polarities (e.g., vertical/horizontal, etc.) and the input or inputs used to connect the radio to the passive combiner/divider may account for this, e.g., including two or more ports (connectors).

In general, all of the radios (in the plurality of radios) connected to the same antenna may had a synchronized duty cycle for Transmission (Tx) and receiving (Rx). For example, the duty cycle of the plurality of radios is 50/50, 67/33, or 25/75 (any other duty cycle ratio may be used).

Each of the plurality of radios typically operates in a different frequency channel. The different frequency channels may be adjacent (e.g., immediately adjacent) to each other without a guard band between adjacent channels. For example, each channel may be a 20 MHz channel and the GPS-synchronized radios may talk simultaneously over the single link on directly adjacent channels, such as one at 5780 MHz and the other at 5800 MHz.

Any of the apparatuses described herein may operate in MIMO, particularly when acting in the shared antenna mode described herein.

Any of the methods and apparatuses described herein may be configured for synchronization using an outside, global synchronization signal source, such as an external GPS. Thus, none of the radios of the plurality of radios may (or must) communicate directly about the synchronization. Thus, these methods including using an external synchronization signal such as a GPS signal comprises synchronizing each of the plurality of radios without communication between the radios. For example, each of the plurality of radios may independently receive the GPS signal. The synchronization of each of the plurality of radios using a GPS signal may occur about every 1 second, e.g., +/−15 nanoseconds. In general, the global synchronization signal does not necessarily have to be GPS but may be some other form of sync amongst the master radios to keep their TX-RX frames aligned.

In any of these methods the step of simultaneously transmitting RF signals from each of the plurality of radios may comprise simultaneously transmitting a synchronized master timing preamble from each of the plurality of radios. A master timing preamble may be sent before each transmission and may include information about the signals being transmitted. The master timing preamble it typically synchronized (e.g., by master timing tick, based on the GPS signal).

As mentioned, any of these methods may include synchronizing a duty cycle of a first remote slave radio using a synchronized master timing preamble transmitted by each of the plurality of radios, and may further include synchronizing a duty cycle of a second remote slave radio with a synchronized mater timing preamble. Any of the slave radios communicating with the master devices may synchronize by sliding a receiver frame until the master timing preamble is identified. This is possible even when the remote (slave) radio false synchronizes to another timing preamble, such as a slave preamble symbol from a nearby (slave) radio.

Thus, any of these methods may include transmitting RF signals from the first remote slave radio to the single antenna during a transmission frame determined by the synchronized duty cycle of the first remote slave radio.

In general, passively combining the inputs of each of the plurality of radios into the single output coupled to the single antenna may include passing inputs from each of the plurality of radios through a Wilkinson power divider/combiner having an output coupled to the single antenna.

The apparatuses described herein may be configured to operate in an unsynchronized mode or in a synchronized mode. For example, any of these methods may also include switching from an unsynchronized mode of operation to a shared antenna mode in which each of the plurality of radios is synchronized using the GPS signal to operate on the same duty cycle.

Also described herein are apparatuses that are configured to perform the methods described above. These apparatuses may include hardware, software and/or firmware for performing the functions described herein. For example, described herein are multiplexer apparatuses for combining a plurality of radios so that they simultaneously send or receive from a single antenna. Such apparatuses may include: a first external mount configured to hold a first radio, and a first input configured to connect to an input of the first radio; a second external mount configured to hold a second radio and a second input configured to connect to an input of the second radio; a passive power divider/combiner coupled to the first input and the second input, the passive power divider/combiner configured to passively combine RF signals from the first and second input and output them to an antenna port and to divide RF signals from the antenna port between the first and second inputs; and an antenna mount for holding a single antenna, wherein the antenna port is in or adjacent to the antenna mount.

In some variations the apparatuses may include the radio(s) and/or the single antenna. The antennas (e.g., the single antennas) into which the plurality of master radio devices feed may be any type of antenna. For example, as used herein, a single antenna may include a single reflector (e.g., parabolic dish) for both transmitting and receiving or it may refer to a compound antenna having a dedicated Tx reflector and a dedicated Rx reflector, or it may include an array antenna that operates as a single antenna (e.g., microstrip array antenna). The single antenna may be a directional antennas or a non-directional (e.g., omni) antenna. The type of antenna is generally not relevant to combining of the radios on the single antenna. For example, the combining could occur as several multi-point access points combined on a single omni antenna (e.g., two or more combined) communicating with individual (client) subscribers. Multiple point-to-point masters radios on a single antenna (which could be an omnidirectional antenna) may link to individual point-to-point slaves radios on individual antennas in different directions around the single antenna (master radios).

Any of the apparatuses described herein may be integrated with either or both the radio(s) and/or the antenna. For example, a multiplexer apparatus for combining a plurality of radios so that they simultaneously send or receive from a single antenna may include: a first external mount configured to hold a first radio, and a first input configured to connect to an input of the first radio; a second external mount configured to hold a second radio and a second input configured to connect to an input of the second radio; a passive power divider/combiner coupled to the first input and the second input, the passive power divider/combiner configured to passively combine RF signals from the first and second input and output them to an antenna port and to divide RF signals from the antenna port between the first and second inputs; and a single antenna coupled to the first and second external mounts, wherein the antenna feed is coupled to the antenna port.

As mentioned, in any of these apparatuses the passive power divider/combiner may be a Wilkinson divider/combiner.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 4A-4D show one example of a multi-radio antenna apparatus that is highly synchronized as described herein, from isometric, side, front and back views, respectively.

FIGS. 5A-5D illustrate another example of a multi-radio antenna apparatus similar to the variation shown in FIGS. 4A-4D above, including a mount for a pair of radios (though additional radios may be used, including dynamically added/removed, without disruption or loss of data, as described herein.

FIG. 10B also shows how different slave radios may be synchronized with the multiplexed master radios when the master radios are operating in a shared antenna mode.

DETAILED DESCRIPTION

Figure 1A:
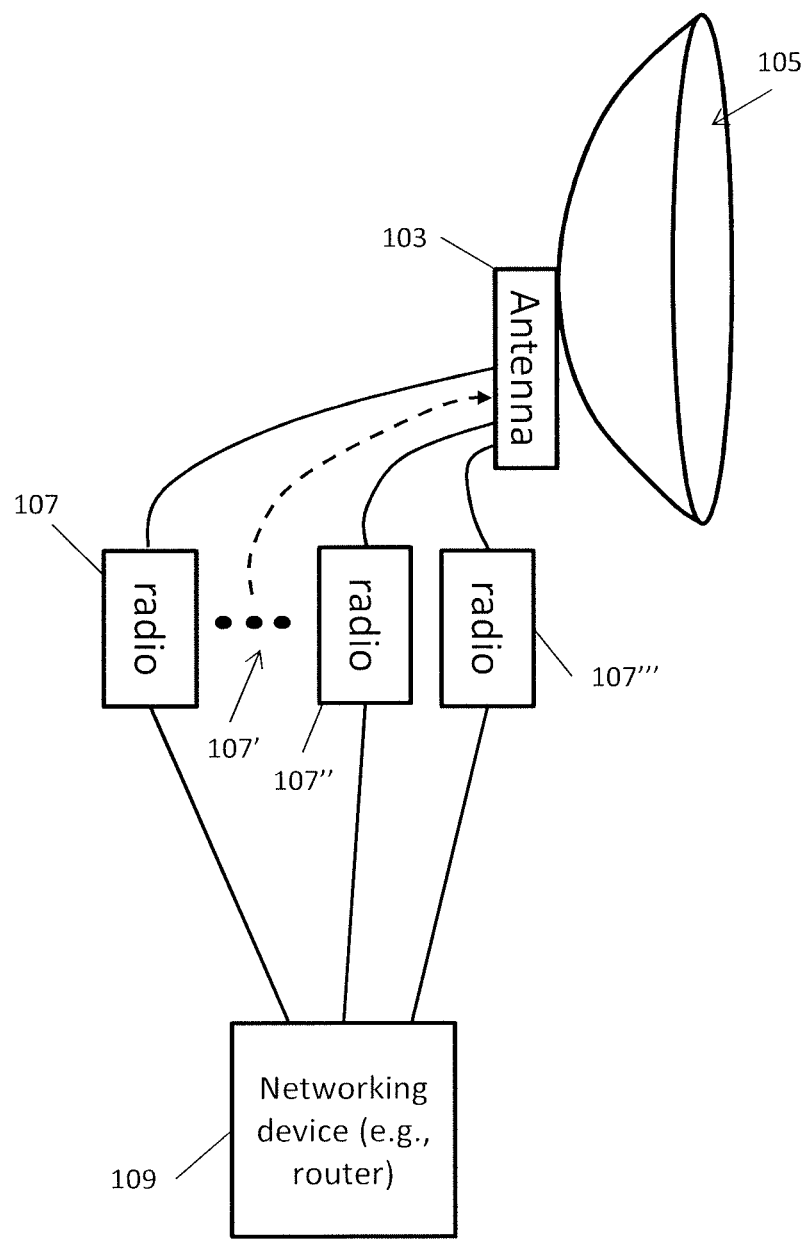
FIG. 1A is a schematic illustrating a system as described herein comprising one example of a multi-radio antenna apparatus having a plurality of n radios all connected (e.g., through one or more dividers/splitters coupled at the antenna feed) to the same antenna; each radio is also connected to a networking device (e.g., router) that automatically load-balances the radios.

Described herein are multi-radio antenna apparatuses and stations for wireless networks including multiple radios coupled to a single transmit/receive antenna, in which the antenna (and/or the radios) is highly synchronized. These multi-radio antenna systems may provide highly resilient links. Synchronization (e.g., GPS synchronization) may allow these apparatuses to organically scale the transmission throughput while preventing data loss. The single transmit/receive antenna may have a single dish or a compound (e.g., a single pair of separate transmitting and receiving dishes) and connections for two or more radios. These apparatuses may be configured for frequency division multiplexing with concurrent transmission from each of the radios out of the same antenna, with minimal or no isolation between radio units.

In general, the apparatuses described herein include a single antenna assembly that is couples to an operates with a plurality (e.g., 2 or more, 3 or more, 4 or more, 5 or more, 6 or more, 7 or more, 8 or more, 9 or more, ... n or more, or between 2 to n, between 3 to n, between 4 to n, etc. where n is 4, 5, 6, 7, 8, 9, 10, 11, 12, 13, 14, 15, 16, 17, 18, etc.). The antenna assembly typically includes a single combined transmitting/receiving antenna emitter/detector (transceiver or simply "emitter" for convenience), or a pair of transmitting antenna emitter and receiving antenna detector (see, e.g., US 2014/0218255).

The antenna assembly may also include an emitter (e.g., combined emitter/absorber for transmitting and/or receiving RF energy). The emitter may be mounted within a reflector (e.g., parabolic reflector). The emitter/absorber surface may include one or more feeds (e.g., horizontal and vertical, or other polarization feeds) and each feed may include one or more power splitters/power combiners, such as, e.g., a Wilkinson power splitter/power combiner. The power splitter/power combiners may be nested (e.g., multiple power splitter/power combiner may be connected together to multiply divide the signals between the plurality of radios associated with the apparatus. The power splitter/power combiner may be 1:2, 1:3, 1:4, 1:5, 1:6, 1:7, 1:8, 1:m, 2:3, 2:4, 2:5, 2:6, 2:7, 2:8, 2:9, 2:10, 2:p, etc. For example, the apparatus may include a lumped element 2-2ay Wilkinson splitter/combiner coupled to the feed(s) of the antenna, through which the different radios connect to the emitter. Wilkinson power splitter/power combiners may be particularly useful, as they may be compact and do not typically require special electronics.

Although the use of power splitter/power combiners as described above and shown here may result in a loss in overall power of the transmitted signal (e.g., this loss has been measured as about 3.5-4 dB), the tradeoff may be an increase in throughput. When the radios are highly synchronized (e.g., using a high-accuracy GPS signal) and/or when operated with a networking device (e.g., router) that can dynamically monitor and balance the operation of the radios, the result is a highly scalable increase in signal throughput (which may linearly scale as the number of radios increases) without loss or delay as radios are removed/fail.

Any of the antenna assemblies described herein may include GPS synchronization that is sufficient to synchronize within appropriate timing (e.g., within less than 100 ms, 50 ms, 25 ms, 10 ms, 5 ms, 1 ms, 0.5 ms, 0.1 ms, 0.05 ms, 0.01 ms, etc.) so that the radios receive and transmit on the same, nearly-identical (within the timing parameters just mentioned) schedule, without requiring any coordination between the radios. This transmitting/receiving schedule may be regularly 'refreshed' by the accurate GPS signal, and each radio may be configured to operate within a predetermined schedule. The use of the highly accurate GPS timer as described may allow the radios to function in a coordinated manner by the pre-set, shared schedule, without requiring that the radios talk with each other or with other systems before they transmit and/or receiver. Thus, the radios do not need to handshake or otherwise communicate back and forth with each other, which would typically delay operation. The apparatuses (which may generally include devices and systems) described herein typically use the GPS signals as a reference clock and do not have to talk with each other, or even be aware of each other to function in a coordinated, and therefore more efficient manner. Instead, the radios may send and/or receive data frames based on the preset schedule and the GPS clock without coordinating/communication between the radios. The use of the GPS timing, when the accuracy is sufficiently high, may allow an intelligent architecture such that dividing multiple radio signals between one or more antennas may be successfully performed.

Any of the apparatuses described herein may use any appropriate signal multiplexing technique. In particular, the apparatuses described herein may use frequency division multiplexing. Frequency division multiplexing may allow a plurality of radios coupled to the same antenna apparatus to transmit at the same time and receive at the same time using the apparatus architecture described herein.

For example, the synchronized radios may be configured on a repeating and/or resetting schedule that determines when transmission occurs, when receiving occurs. For example a GPS synchronizing signal may initiate a cycle in which, e.g., every second a counter is re-set so that transmission occurs every 200 ms; at the end of a predetermined period, the cycle is re-set by the GPS synchronization in all of the radios, therefore the radios get re-time synched at the next second. Alternatively, another architecture may include the use of filters; the use of synchronizing GPS as described herein may prevent or reduce the need for this level of signal filtering, which may be expensive and lossy.

In general, radios may be configured to each receive the synchronizing signal (GPS signal) directly or from the antenna assembly that they are connected to. For example, an antenna assembly may include connections (docks, attachments, etc.) for connecting to a plurality of radio devices, and may also include the high-accuracy GPS synchronizing circuitry described herein; alternatively or additionally, the radios may be configured to receive directly the GPS synchronizing/timing signal.

In general, each radio may be operating within a different (e.g., offset) frequency range within the bandwidth of the antenna assembly. For example, when three radios are used, the upper, middle and lower frequency ranges of the bandwidth of the antenna may be parsed between the three radios. The antenna assembly may set the frequency range for each radio.

The apparatuses described herein may allow on-the-fly addition/removal of radio devices. For example, the systems may include radios that are added/removed or degrade during operation without interrupting the transmission. Thus, these apparatuses may operate at full capacity even as one or more radios are added/removed or degrading. This functionality may be enhanced by the use of a networking device such as a router, or other controller, that monitors the radio operation/throughput, and dynamically balances the transmission loads between the different radios. Any of the apparatuses (e.g. multi-radio antenna systems) described herein may therefore be load-balanced multi-radio antenna systems and may include or be configured to operate with a controller (e.g., network device, router, etc.) that load balances between the radios.

Thus, any of these apparatuses may automatically load balance between the radio devices coupled to the same antenna. The network device (and therefore the system) may thus detect when a radio that is connected to the antenna has degraded (e.g., reduced throughput, efficiency, and/or failed, etc.) and re-balance between the remaining radios, e.g., by switching which radios transmit the 'load' of data packets. Unlike other systems that may require down-time while switching, the apparatuses described herein may constantly evaluate the capacity of the radio(s) connected and may detect failure; when failure or performance degradation (or improvement) is detected, the apparatus may handle it by adjusting the load. In general, the apparatuses (e.g., network devices, routers, etc.) described herein may detect the change in capacity between radios in terms of Mbit/sec balance based on the changes in rate.

For example, FIG. 1 is a schematic of one example of a system as described herein. In this example the apparatus includes a single-dish (TX/RX) 105 antenna 103 that receives high-accuracy GPS data and communicates it to each of a plurality of radios that are connected 107, 107', 107", etc. The radios are all connected to a networking device 109 (e.g., a router) that can monitor and balance the data loads between the different radio devices. In this example, the router may be part of the overall apparatus (e.g., the antenna) or it may be located remotely (immediately nearby, e.g., short cable connection, or connected by long cabling). The networking apparatus may also include a fiber uplink so that the apparatus can feed power (e.g., DC power) to the rest of the system (e.g., radios and/or antenna).

Load balancing may be done automatically, e.g., after an initial set-up/detection step, or it may be user adjusted/ modified. Appendix A, attached hereto, including one example of an apparatus (configured as a router) that may be used as described herein.

Figure 2:
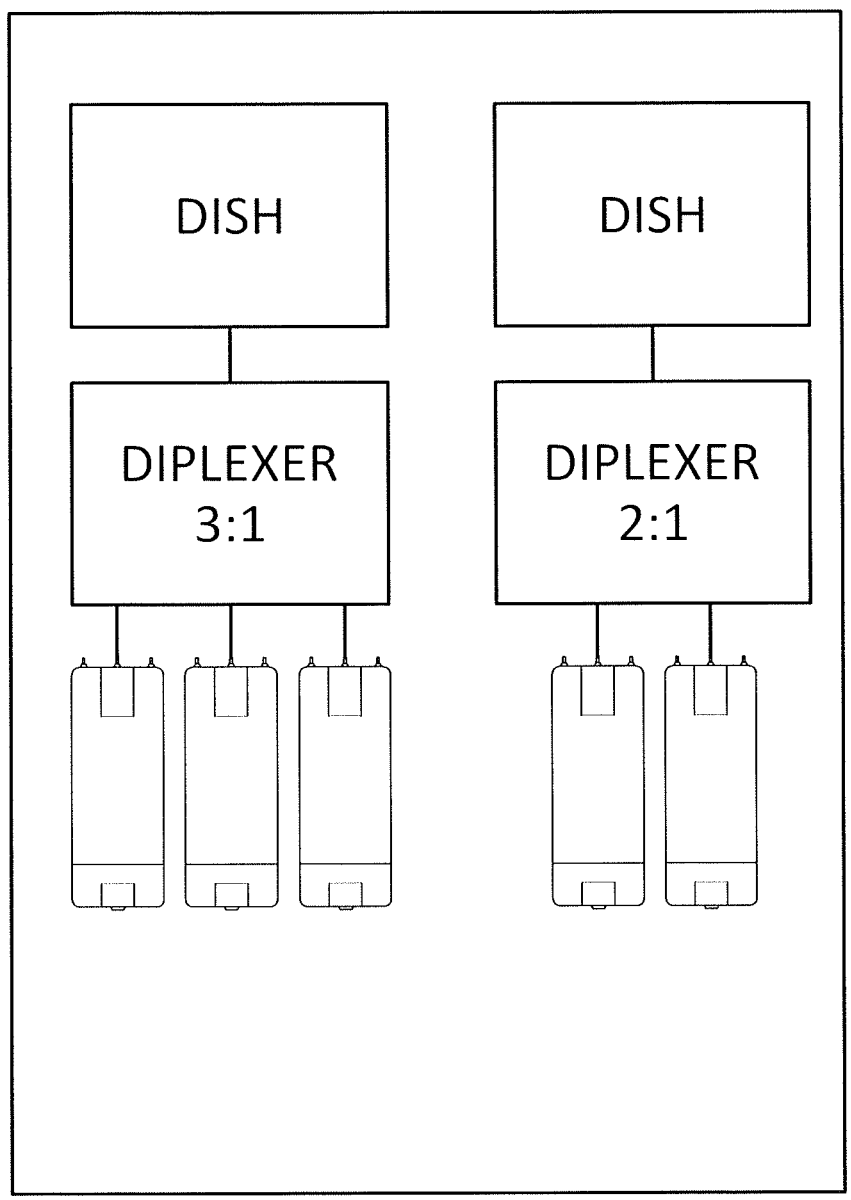
FIG. 2 schematically illustrates example of 3:1 (on left) and 2:1 (on right) multi-radio antenna apparatuses as described herein.

FIG. 2 schematically shows one variation of two systems (one with 3 radios on the left, another with 2 radios, on the right). In either example, the apparatus may include a 3:1 or 4:1 splitter or more (e.g., 5:1, 6:1, 7:1, 8:1, etc.); the additional radios may be absent; the apparatus (by itself or in combination with a separate networking device (e.g. router) may provide the load balancing. As discussed above, the "diplexers" shown (3:1, 2:1) in this example may be splitter/divider/combiners, such as Wilkinson splitter/divider/combiners.

Figure 3A:
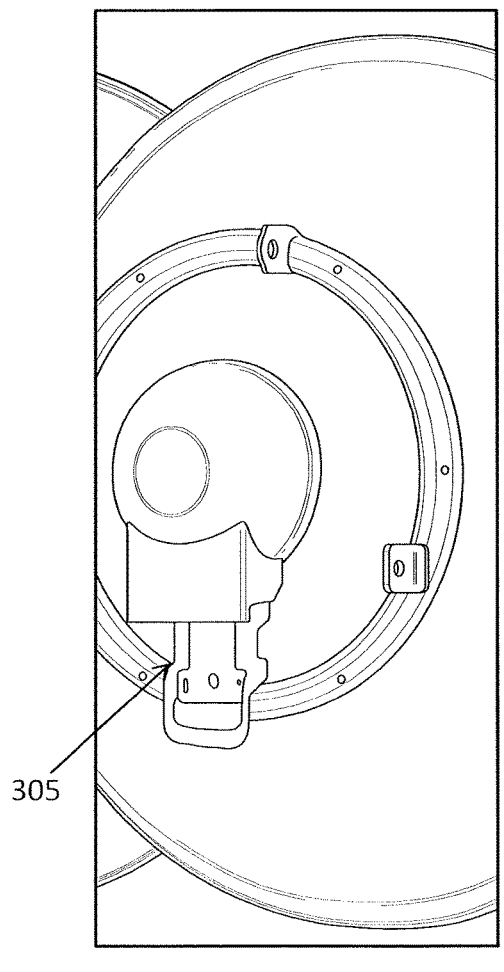
FIG. 3A is an example of a back of an antenna as described herein, including a radio mount for a single radio.
Figure 3B:
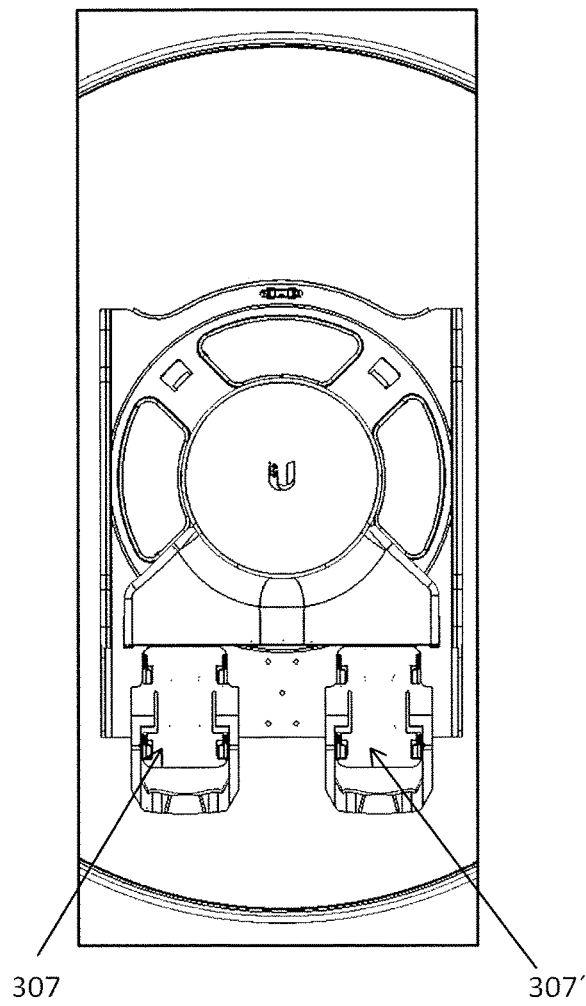
FIG. 3B shows an example of a back of an antenna having a housing/mount for two radios as described herein.

In general, any of the apparatuses described herein may include multiple radios and may be adapted to hold or secure these radios onto the back of the apparatus, as shown in FIG. 3A (showing a back mount for a single radio 305) and FIG. 3B (showing a back mount configured to hold two radios 307, 307". Additional radios may be connected (e.g., by cables) or to an auxiliary mount (not shown).

FIGS. 4A-4D illustrate one example of a multi-radio apparatus. In this example, a single reflector 401, includes an emitter (not visible) within the mouth of the antenna assembly 405 to which one or more splitter/divider/combiners are attached. In general, splitter/divider/combiners may be chained in series and/or parallel to provide additional splitting/combining of the signal; although this may result in power loss, the benefits in throughput may outweigh the disadvantages. The back of the device (visible in FIGS. 4B and 4D) may include mounts/connectors for connecting to a plurality of radios. Each radio may, without communicating with each other at all, synchronously transmit from the same emitter and reflector (antenna dish), as described above.

Figure 6:
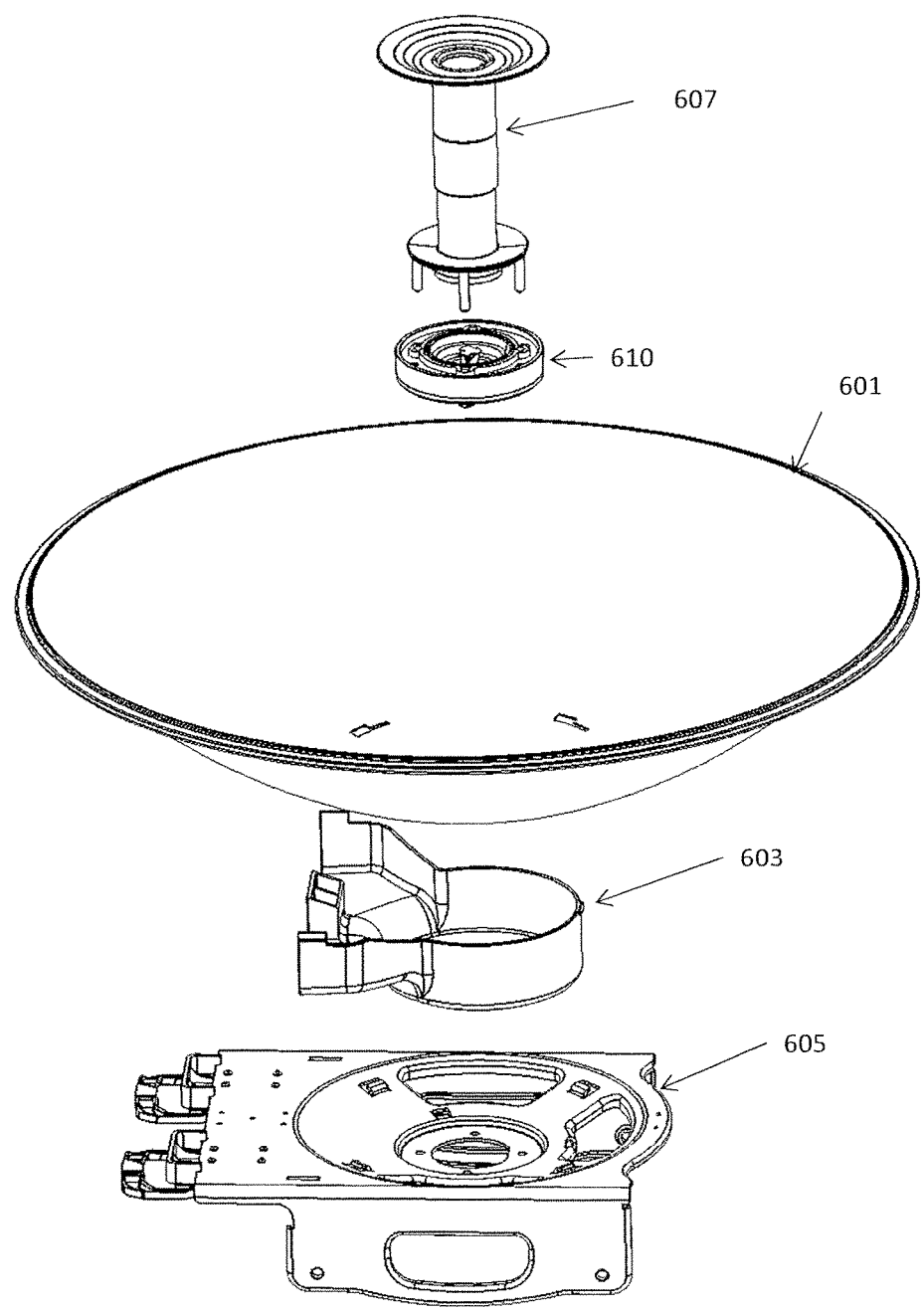
FIG. 6 is an exploded view of the multi-radio antenna apparatus of FIGS. 5A-5D.

The variation shown in FIGS. 5A-5D is similar to that shown in FIGS. 4A-4D, but includes a mount 501, similar to that shown in FIG. 3B. An exploded view of this apparatus is shown in FIG. 6, showing the reflector 601, the mount and radio holder(s) 605, housing 603, a tube (waveguide) 607 and the emitter with coupled splitter/divider/combiner 610. The networking device is not shown, but may be connected to each radio (also not shown) within the radio apparatus. The apparatus may be mounted to a pole, wall, post, etc., either indoor or outdoor (preferably outdoor).

Figure 7:
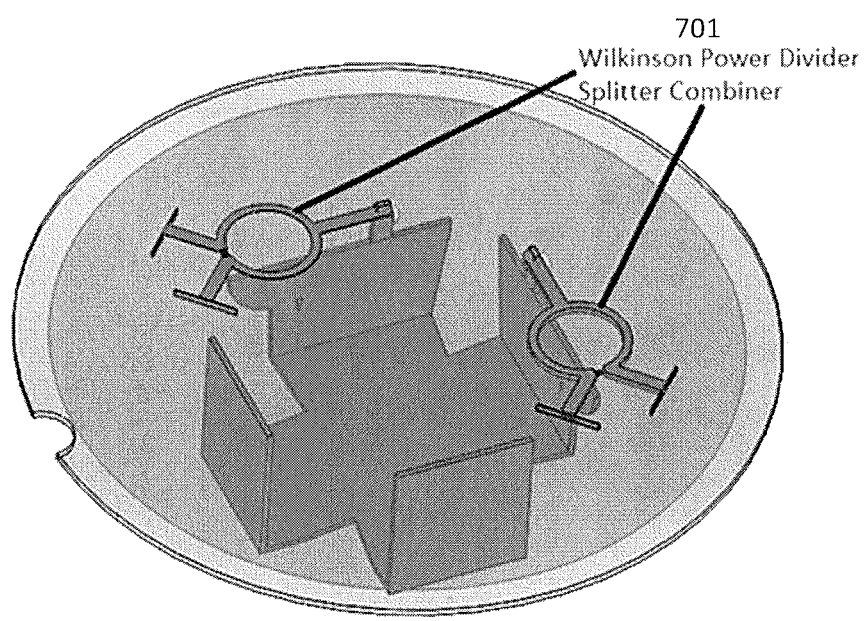
FIG. 7 is an example of one variation of a power splitter/power combiner that may be used with any of the apparatuses described herein. In this variation, the power divider (also referred to herein as a power splitter, and power combiner) is a Wilkinson power divider/splitter/combiner and is coupled to the feed of the antenna emitter, as shown.
Figure 8A:
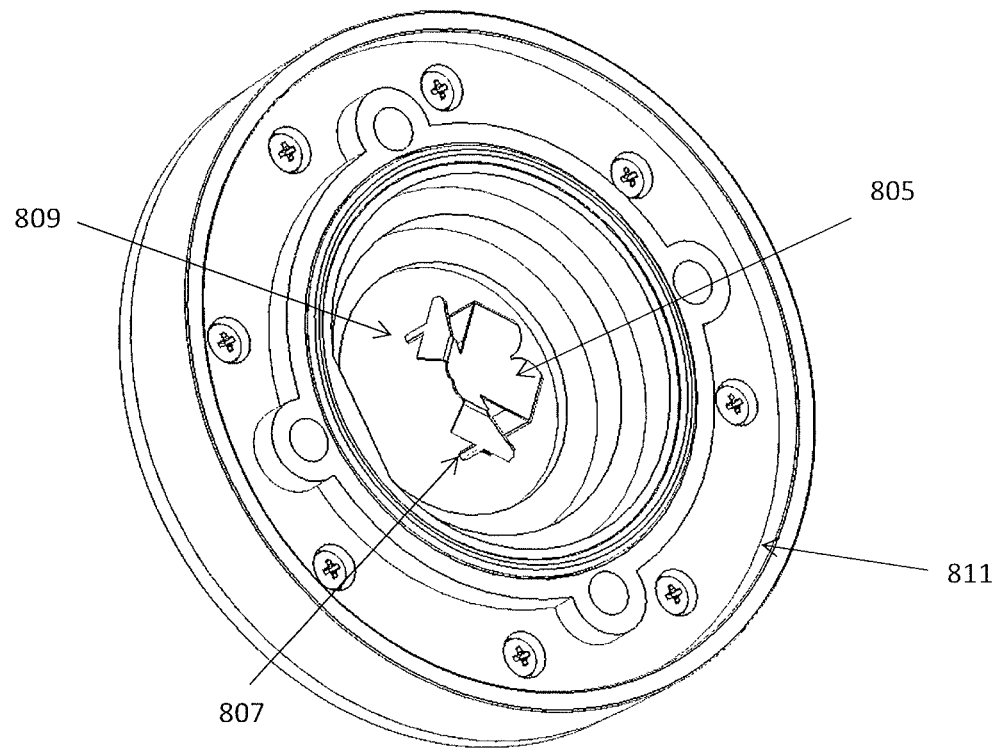
FIGS. 8A and 8B show example of an antenna emitter assembly including a power divider as described herein.
Figure 8B:
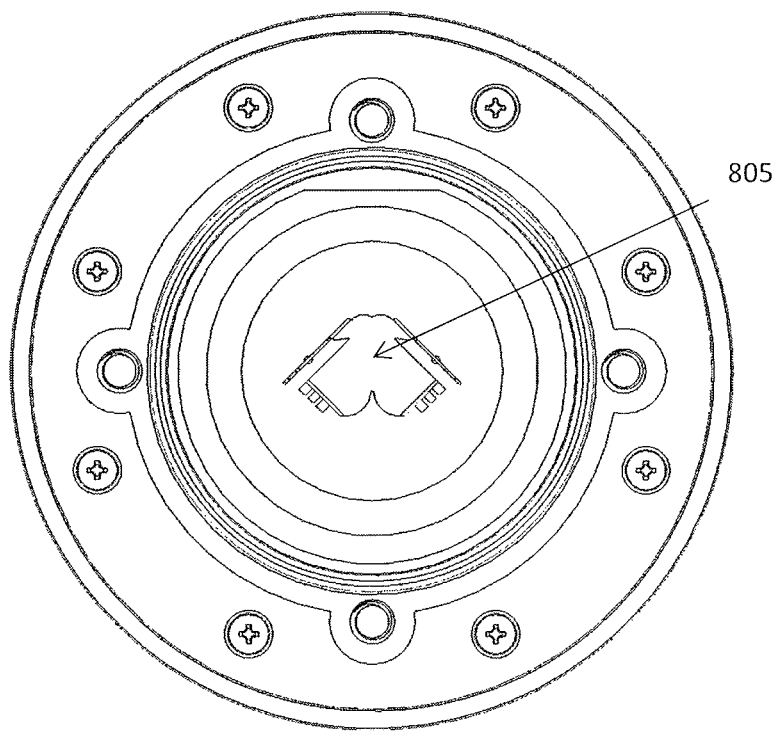

FIG. 7 shows one example of an emitter of a multi-radio synchronized antenna apparatus as described above, including a pair of splitter/divider/combiners. In this example the splitter/divider/combiner are Wilkinson-type splitter/divider/combiner 701; each polarization feeding into the emitter is attached to a splitter/divider/combiner (e.g. a 2:1, 4:1, etc. splitter/divider/combiner, etc.). This structure, or one like it, may be incorporated into any of the apparatuses described herein. For example, FIGS. 8A and 8B show one example of a portion of the antenna apparatus of FIGS. 5A-5D. In this example the emitter 805 is fed by a pair of feeds 807, 809 which are connected directly to one or more splitter/divider/combiners (e.g., multiple splitter/divider/combiners may be connected to each other in series) (not shown). Each splitter/divider/combiners may be connected to each radio of the plurality of radios, as described above, and each radio may in turn be connected to the networking device that may monitor and load-balance the radios.

The emitter portion (emitter/absorber) portion shown in FIGS. 8A and 8B may also be connected within the antenna apparatus to the RF signal channel, such as an RF waveguide (see, e.g., FIGS. 4A-4C, 5A-5C, and 6) which, along with a reflector (e.g. parabolic reflector) may channel the RF energy to/from the apparatus.

Figure 9:
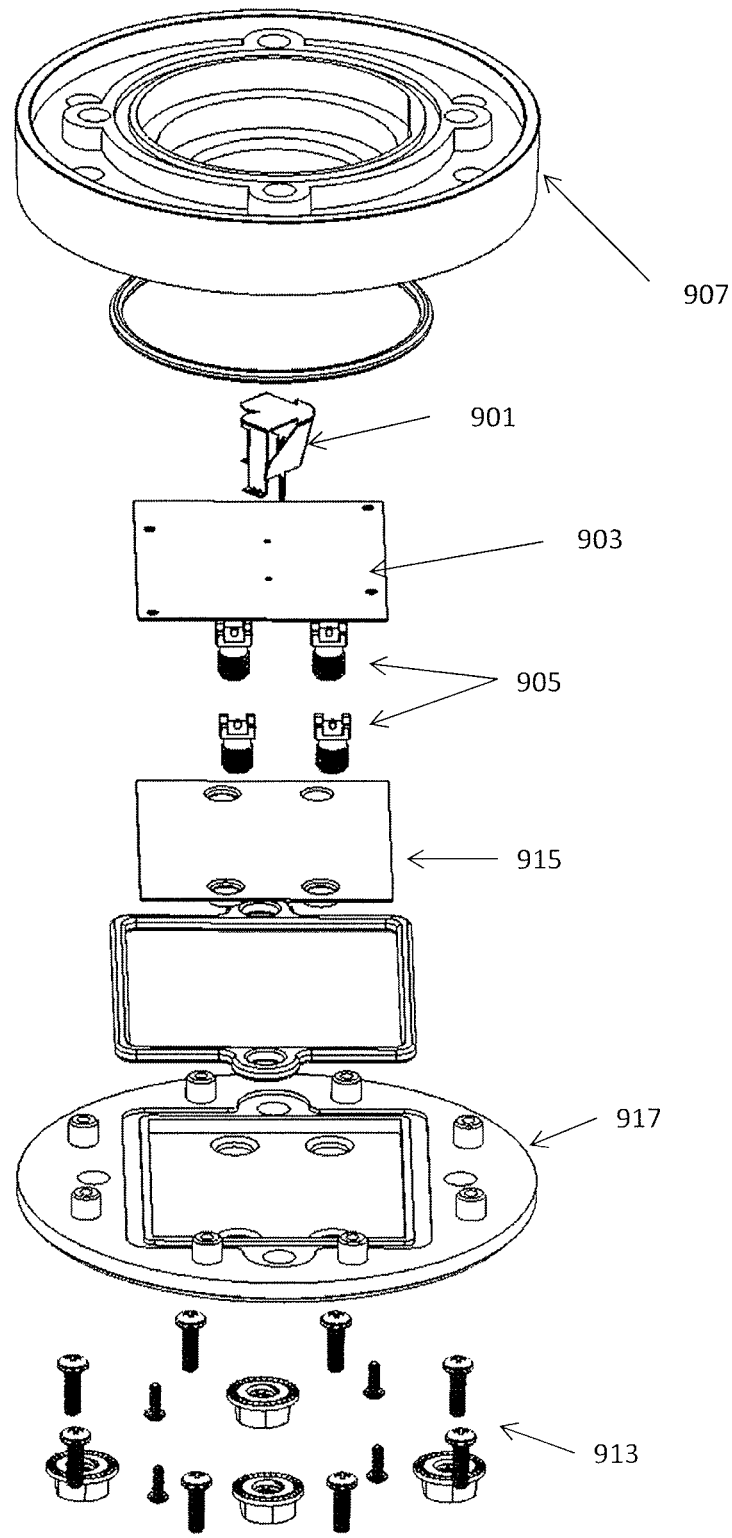
FIG. 9 is an exploded view of the antenna emitter assembly shown in FIGS. 8A and 8B.

FIG. 9 shows an exploded view of the emitter assembly shown in FIGS. 6A and 6B, including the emitter/absorber 901 having two or more feeds (not visible, e.g., for vertical and horizontal or other polarizations), a splitter/divider/combiners 903, and multiple connectors 905 for connecting (in this example, 4 are shown) to the multiple radios that may be connected. The housing 907 may include multiple components including brackets 911, fasteners 913, and mounts 915, 917.

EXAMPLES

Figure 1B:
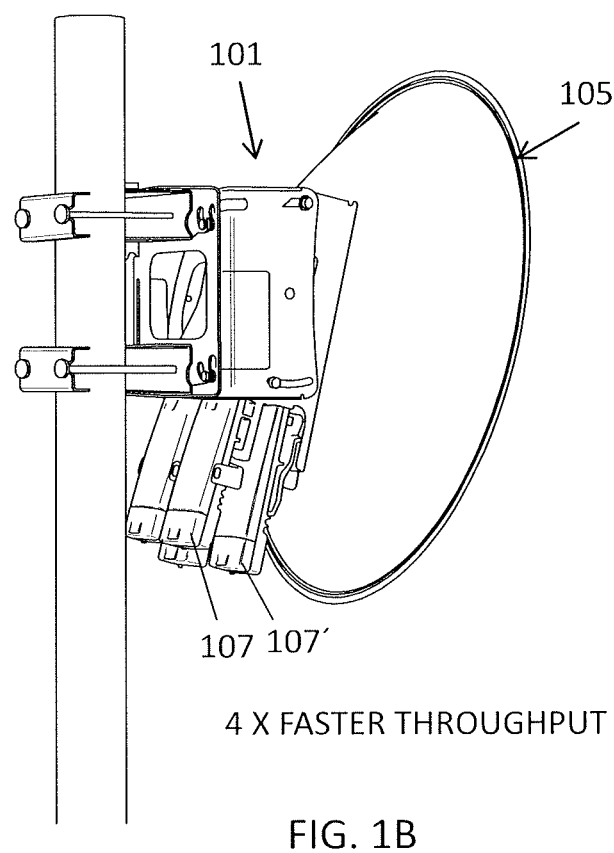
FIGS. 1B and 1C show side and bottom views, respectively, of one example of a multiplexer apparatus configured to combine a plurality of radios so that they simultaneously send or receive from a single antenna.
Figure 1C:
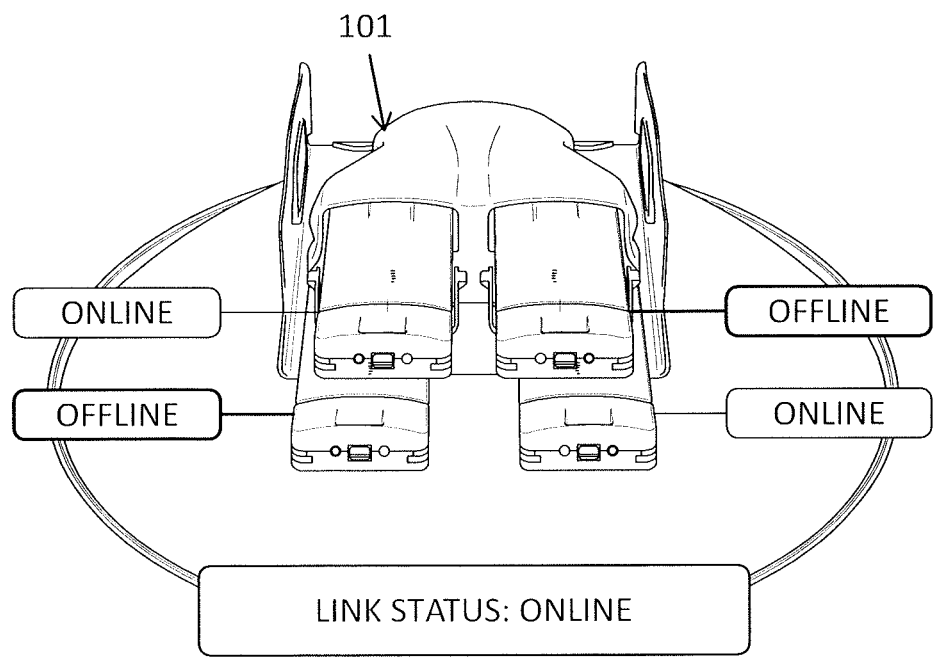
Figure 1D:
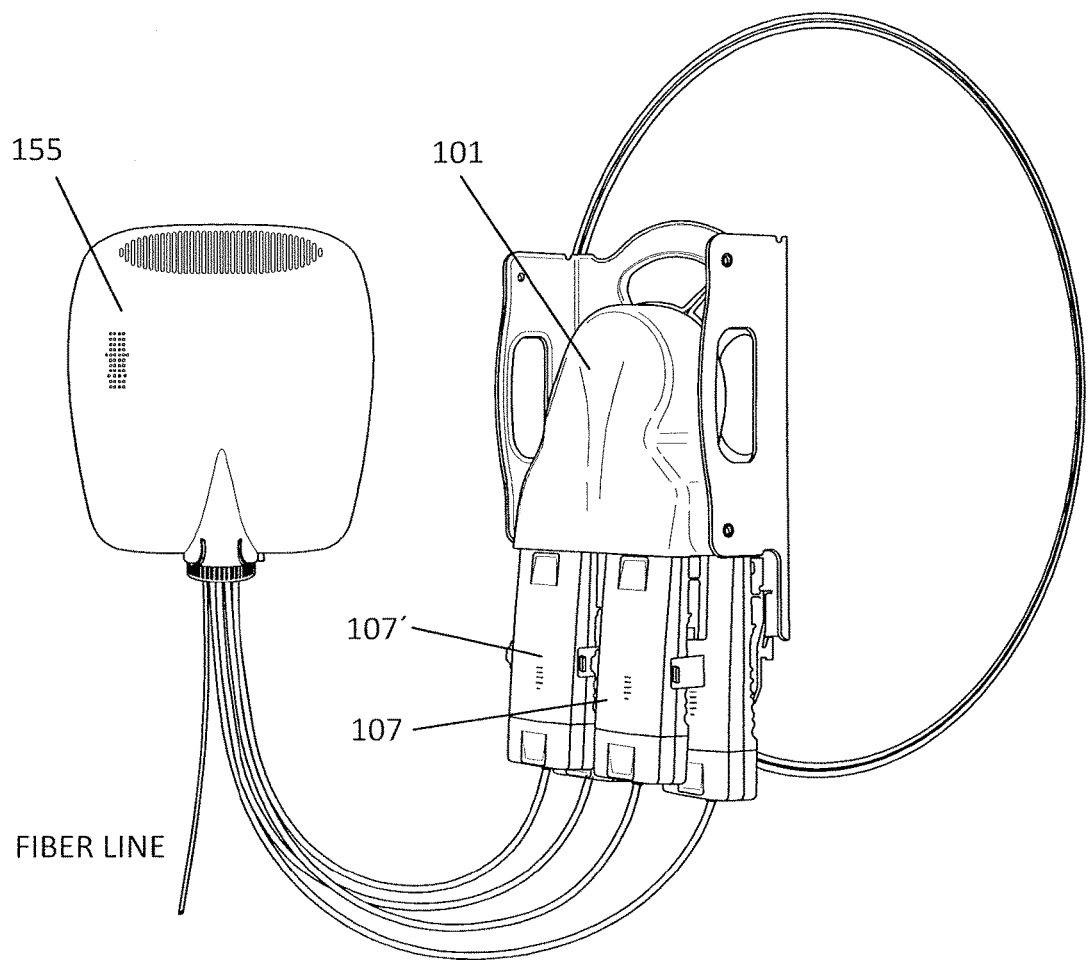
FIG. 1D illustrates a system including a multiplex such as the one shown in FIGS. 1B and 1C and a router.

In some embodiments of the methods and apparatuses described herein, the apparatus is a scalable MIMO Multiplexer having a very reduced footprint because it can efficiently combine multiple radios with a single antenna (e.g., in some variations a single reflector). FIGS. 1B-1D illustrate examples of such a multiplexing apparatus, which may be referred to as an "N×N" MIMO multiplexer. This apparatus may have multi-gigabit throughput, and also allows redundancy between the included radios, without the need for additional antennas. Each of the radios may transmit synchronously and receive synchronously. Because they are synchronized and their RF signals passively mixed by the multiplexer, they may simultaneously communicate from the same antenna with very little Rx degradation/interference (e.g., cross-talk, etc.); each radio may transmit at a different frequency band, and these bands may be immediately adjacent, without the need for a guard band between nearby frequency bands.

FIG. 1B shows an example of a multiplexer having four attached radio devices 107, 107', shown mounted, e.g., on a tower or post. The multiplexer is integrated with a single antenna, in this variation having a parabolic dish 105 for Tx/Rx. FIG. 1C shows a bottom view of this apparatus, showing the four radios in which two of the radios are "offline" while the remaining two radios remain dynamically connected to the multiplexer, illustrating the redundancy. Even when some of the radios are offline, as long as one of the radios is online, the link remains active.

The methods and apparatuses described herein typically synchronize each (master) radio extremely accurately through their GPS clock receivers. RF timeslots are framed and transmitted to allow multiple radios to sync without being in communications with each other and without requiring any direct electrical connection (e.g., wiring) between them. These methods and apparatuses embodying them are sufficiently accurate so that there is little or no interference between the radios which all transmit and receive at nearly exactly the same time (within tens of nanoseconds). Thus each local (master) radio will not transmit when another local (master) radio is receiving or vice versa.

In any of the variations described herein, each of the radios may use a common GPS timing reference. All of the (master) radios in the multiplexer may independently receive the GPS timing reference. Any downstream (slave) radios may also reference the same external GPS timing signal; in some variations it is not necessary that the slave devices reference the external GPS timing signal. The slave devices may instead synchronize their duty cycle off of the preamble (master preamble symbols) transmitted by the radio(s) as part of their transmission frame (during the Tx portion), prior to transmission of the Tx symbols.

As described above, in general, the ports (output/input) for each of the radio devices connect to the same antenna device through a passive combiner/splitter that can combine the input/output for all of the radio apparatuses (for each polarization, for example) into a single input/output for the antenna. In some variations a Wilkinson splitter (also referred to as a Wilkinson combiner, Wilkinson divider, etc.) is a wide-band multi-port and passive construct which can take a single input and splits it into two or more outputs, keeping a level of isolation between the input and outputs and the two outputs themselves. As a passive device, it works in the opposite direction, as a combiner.

In the methods and apparatuses described herein, when operating in a shared antenna mode, the transmitting/receiving is done in the time domain (instead of the frequency domain), and the radios may include adjacent channel rejection characteristics, and be used with a very low noise power amplifier, allowing two channels directly next to each other.

In the methods and apparatuses described herein, the bands for each radio may have any appropriate channel width. For example, two or more 50 MHz links (each corresponding to a single master radio) may be delivered from the same dish (assuming the spectrum is available), which would provide 800 Mb aggregate. As mentioned, the channels don't have to be directly adjacent although they may be; the operating channels for each radio can be anywhere in the band. The band of each radio may be of any appropriate size, and may be different from each other. Note that each radio may provide multiple polarizations (e.g., horizontal, vertical, etc.). These different polarizations may also be passively combined. In some variations all of RF signals of a particular polarization for all of the radios may be passively combined and fed to the same antenna. In some variations, different passive combiners/splitters may be used for each polarization. In some variations the same passive combiner/splitter may be used.

Although the disclosure herein describes the advantages and use of passive combiner/splitters such as the Wilkinson splitter, any appropriate passive combiner/splitter may be used. A Wilkinson combiner typically allows combining with little frequency selectivity but there are many other broadband and combiners that may be used to sum the radio signals on one single antenna. Further, these methods and apparatuses are not limited to passive combiners; the same principles may apply to active combiner/splitter subsystems, and therefore such active combiner/splitters may alternatively be used in any of these methods and devices. In addition, some of the concepts (e.g., GPS synchronization) may also be applied even without combiner/splitters and a single antenna. For example, multiple radios each connected to separate antennas may be synchronized, particularly where the antennas are adjacent/near but separated by a physical isolation/boundary or barrier (e.g., "choke boundary").

Note that in some variations the apparatuses and methods may allow operating in other modes which may not include the benefits described herein for the shared antenna mode, but may allow operation of the radio devices even in the absence of external (e.g., GPS) synchronization between these radio devices. Other modes may also allow frequency-domain operation. In some variations the apparatuses described herein may be configured to switch between modes, e.g., between the synchronized "shared antenna mode" and other modes that may not be externally synchronized, including frequency-domain operational modes. Switching may be done manually or automatically. Automatic switching may be performed based on the presence/absence of the GPS timing signal (or the strength of the signal), based on signal quality considerations, and/or based on spectral information (e.g., available bandwidths).

As mentioned, any of these apparatuses may also be used as part of a MIMO configuration. For example, with two radios connected and multiplexed to a single antenna as described herein 4×4 MIMO may be achieved (with 2× faster throughput); with four radios, 8×8 MIMO may be used (with 4× faster throughput).

FIG. 1D shows an example of a multiplexing apparatus 101 coupled with a router 155 and two or more radios 107, 107', so that each radio device is connected to the same router, which may allow load balancing between the different radios. In the variation shown in FIGS. 1B-1D, the multiplexing apparatus 101 is coupled with the antenna 105; in some variations the antenna is not integrated with the multiplexing apparatus but is separate. In some variations the antenna is integrated with the multiplexing apparatus. Similarly, the radios may be separate (as illustrated in FIGS. 1B-1D) or integrated with the multiplexing apparatus.

In general, in variations in which the radios are not integrated into the multiplexing apparatus, the multiplexing apparatus may include a plurality of radio mounts for securely connecting each radio to the apparatus. For example, the housing may include bays or slots into which each radio device may be secured. One or more ports for each radio device (not visible in FIGS. 1B-1D) may be near or within each bay or port, to allow connection between each radio device (e.g., the vertical and horizontal input/outputs of each radio) and the apparatus. The ports may be formed in the housing, including in an external housing, allowing quick and easy access to each radio device. The connections may be protected from the elements by a cover, housing or the like.

Figure 11:
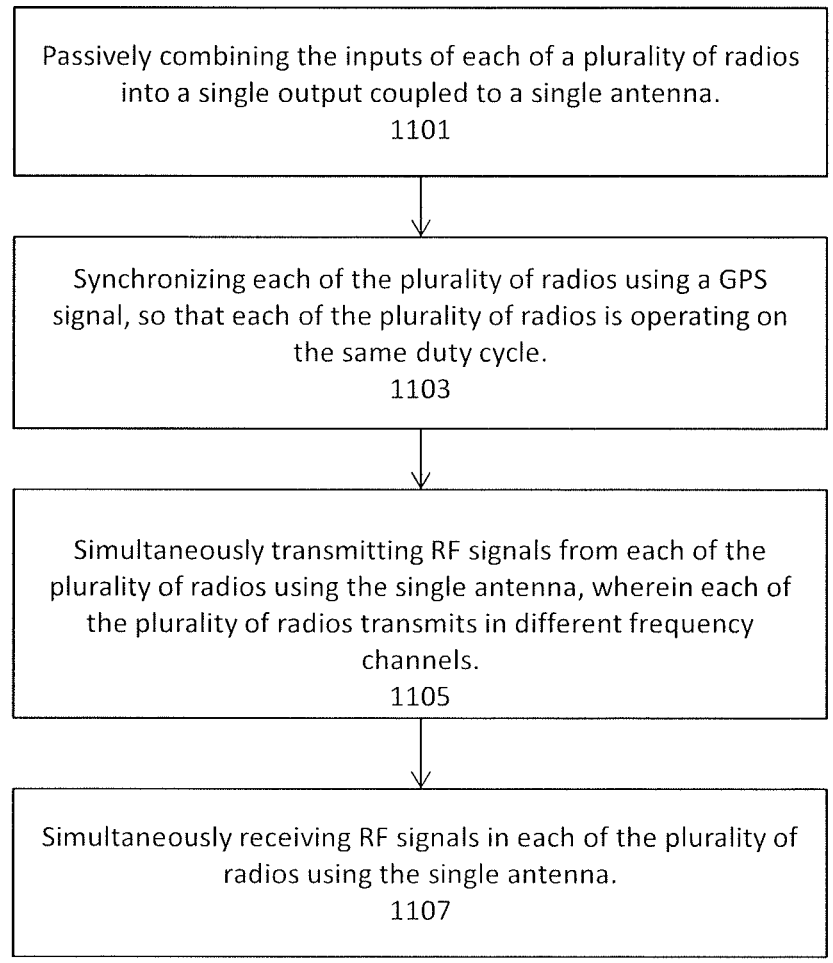
FIG. 11 schematically illustrates one variation of a method of combining a plurality of radios so that they simultaneously send or receive from a single antenna, as described herein.

FIG. 11 describes one method of combining a plurality of radios so that they simultaneously send or receive from a single antenna ("shared antenna mode"), as described herein. In general, the method may include (optionally) connecting each of the radio devices (RF radios) to a multiplexer apparatus so that the inputs/outputs of the radio devices are connected to the multiplexer apparatus. These inputs/outputs of each of the plurality of radios may then be passively combined into a single input/output that is coupled to the single antenna 1101. Alternatively, separate input/outputs for separate polarizations may be combined for all of the radios and connected (separately) to the antenna.

Each of the radios may generally include a GPS receiver and control circuitry (hardware/firmware) for receiving and processing a GPS timing signal. During operation of the multiplexer in the shared antenna mode, all of the connected (master) radios may be synchronizing using a GPS timing pulse signal, so that each of the plurality of radios is operating on a same duty cycle 1103. Synchronization may be periodically and/or regularly (e.g., every 1 second, 2 seconds, etc.) repeated. Each of the radios may then transmit synchronously and receive synchronously according to the synchronized duty cycle. Slave devices receiving and transmitting to the multiplexed ratios may synchronize to the same duty cycle, as will be described in greater detail below.

In general, operation of this method may be regulated and/or controlled by control logic in the multiplexer (e.g., using circuitry, e.g., hardware, and/or firmware and/or software), the radios, and/or a router connected to the multiplexer. For example, the multiplexer may communicate with each radio to indicate that shared antenna mode is operating, and therefore establish the duty cycle that each of the radios will be operating in, as well as indicating that the radio should synchronize via the external GPS signal. Similarly the multiplexer may receive information from one or more of the radios to determine if the apparatus should enter/ remain in shared antenna mode (e.g., based on the presence/absence of a GPS signal, signal degradation, etc.)

In the shared antenna mode, each radio may simultaneously transmit 1105, and may also transmit a synchronized master timing preamble that may be used to synchronize the receiving (slave) radios in the link pair(s). As mentioned, each of the plurality of radios may operate in different frequency channels, which may be directly adjacent and without using a guard band between adjacent Tx frequency bands (e.g., "end-to-end"). Each radio may also simultaneously receive (Rx) RF signals during the appropriate and synchronized portion of the duty cycle using the same antenna 1107. As mentioned, any of these methods may also include synchronizing the slave (e.g., the duty cycle for Tx/Rx) in the link of a first remote slave radio using the master timing preamble.

Figure 10A:
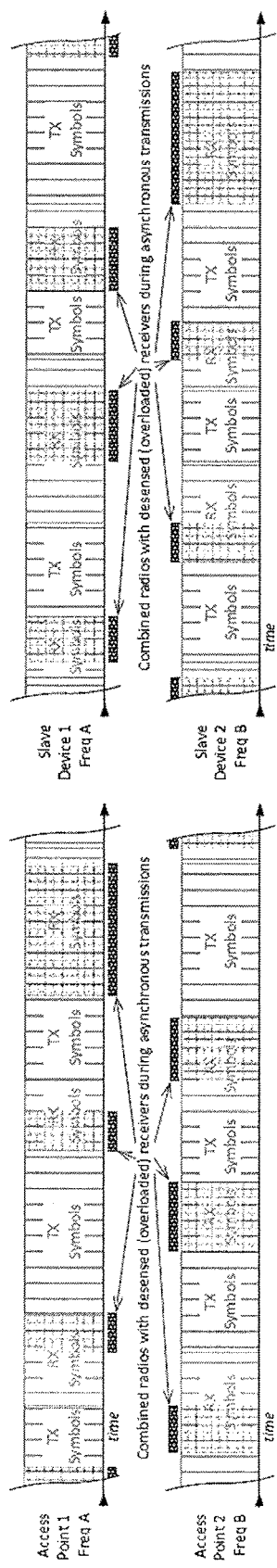
FIG. 10A illustrates the sub-optimal transmission and receiving using an unsynchronized combined (multiplexed) system of two (master) radios sharing a single antenna, showing overloaded conditions that may result between the two radios both attempting to transmit and receive from the same antenna, when communicating with two remote (slave) radio devices.
Figure 10B:
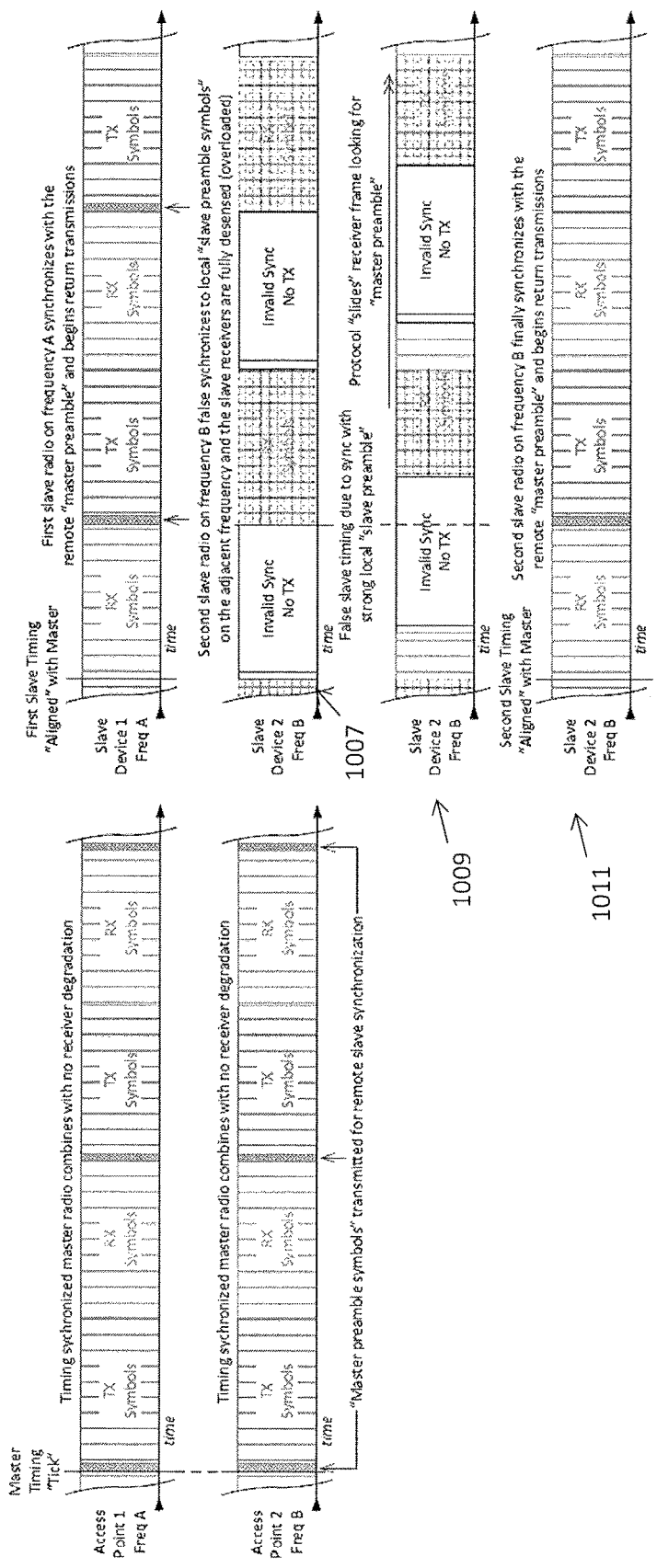
FIG. 10B illustrates transmission and receiving using a synchronized (e.g., via GPS) multiplexed system of two (master) radios sharing a single antenna. External synchronization by GPS in combination with the passive combiner/splitter allows highly economical concurrent transmission by different radios even at immediately adjacent frequency bands without needing the use of a guard band between them.

FIGS. 10A and 10B illustrate transmission links between multiplexed master radios and two linked slave radios. FIG. 10A shows an example of an asynchronous, frameless protocol. In this example, both mater (access point) radios are asynchronous in timing, and combining these radios would result in de-sensed (overloaded) receiving during the asynchronous transmission from slave devices, as illustrated by the underlined regions. Similarly, the slave devices would also suffer from desensed Rx transmission (overload).

FIG. 10B schematically illustrates Tx/Rx during a shared antenna mode, having synchronous framed protocol. On the left, the two master radios are synchronized and passively multiplexed as described above. Both radios transmit or send at nearly exactly the same time, avoiding receiver degradation. The right side of FIG. 10B shows the Tx/Rx frames for each of two downlink radio devices ("slaves"). The first one synchronizes fully with the multiplexed master (as shown) by correctly identifying the master preamble indicating the start of the Tx frame from the master and setting the duty cycle for the slave radio. Thus, the first slave is aligned. The second slave ("Slave device 2") at the second frequency ("Freq B") does not immediately synchronize to the master preamble 1007, but instead mistakenly synchronized to a local "slave preamble" (e.g., from the other slave device, etc.). This results in an invalid synchronization and overloading of the second slave radio. As shown 1009, the second slave radio may then slide the receiver frame to look for the correct master preamble. When it finds the correct master preamble 1011, the second slave radio may then properly synchronize with the remote master preamble, and being return transmissions. Thus, the slave radios may look for and identify the correct master beacon (master preamble symbols) to synchronize with the radio(s) in the multiplexed device.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of synchronizing a plurality of radios so that they simultaneously send or receive from a single antenna, the method comprising:
    combining inputs of each of the plurality of radios into a single output coupled to the single antenna, wherein each of the plurality of radios is held by a radio holder coupled to a mount and attached to the single antenna;
    establishing a duty cycle for each of the plurality of radios relative to all of the radios of the plurality of radios;
    synchronizing each of the plurality of radios using a GPS signal;
    simultaneously transmitting RF signals from each of the plurality of radios using the single antenna, wherein each of the plurality of radios transmits in adjacent different frequency channels; and
    simultaneously receiving RF signals in each of the plurality of radios using the single antenna.

2. The method of claim 1, wherein establishing the duty cycle for each of the plurality of radios comprises setting the duty cycle to one of: 50/50, 67/33, or 25/75.

3. The method of claim 1, wherein each of the plurality of radios operates in a different frequency channel, further wherein the different frequency channels are adjacent to each other without a guard band between adjacent channels.

4. The method of claim 1, wherein the plurality of radios operate in MIMO.

5. The method of claim 1, wherein synchronizing each of the plurality of radios using a GPS signal comprises synchronizing each of the plurality of radios without communication between the radios.

6. The method of claim 1, wherein each of the plurality of radios independently receives the GPS signal.

7. The method of claim 1, wherein simultaneously transmitting RF signals from each of the plurality of radios comprises simultaneously transmitting a synchronized master timing preamble from each of the plurality of radios.

8. The method of claim 1, wherein establishing the duty cycle comprises synchronizing a duty cycle of a first remote slave radio using a synchronized master timing preamble transmitted by each of the plurality of radios.

9. The method of claim 8, further comprising synchronizing a duty cycle of a second remote slave radio with a synchronized mater timing preamble by sliding a receiver frame until the master timing preamble is identified.

10. The method of claim 8, further comprising transmitting RF signals from the first remote slave radio to the single antenna during a transmission frame determined by the synchronized duty cycle of the first remote slave radio.

11. The method of claim 1, wherein synchronization of each of the plurality of radios using a GPS signal occurs every 1 second +/−15 nanoseconds.

12. The method of claim 1, wherein combining the inputs of each of the plurality of radios into the single output coupled to the single antenna comprises passing inputs from each of the plurality of radios through a Wilkinson power divider/combiner having an output coupled to the single antenna.

13. The method of claim 1, further comprising switching from an unsynchronized mode of operation to a shared antenna mode in which each of the plurality of radios is synchronized using the GPS signal to operate on the same duty cycle.

14. A method of combining a plurality of radios so that they simultaneously send or receive from a single antenna, the method comprising:
    combining inputs of each of the plurality of radios into a single output coupled to the single antenna, wherein each of the plurality of radios is held by a radio holder coupled to a mount and attached to the single antenna;
    periodically synchronizing each of the plurality of radios using a GPS signal, wherein each of the plurality of radios is operating on a same duty cycle;

transmitting, from each of the plurality of radios simultaneously, RF signals using the single antenna, wherein each of the plurality of radios operates in different frequency channels;

receiving, in each of the plurality of radios simultaneously, RF signals using the single antenna; and synchronizing duty cycles of the plurality of radios.

15. The method of claim 14, further comprising attaching each of the plurality of radios to the single antenna.

* * * * *